US012654695B2

(12) United States Patent
Bouges et al.

(10) Patent No.: US 12,654,695 B2
(45) Date of Patent: Jun. 16, 2026

(54) METHODS AND SYSTEMS FOR ASSISTING DRIVER DURING LANE SPLITTING

(71) Applicant: Valeo Schalter und Sensoren GmbH, Bietigheim-Bissingen (DE)

(72) Inventors: Damien Bouges, Troy, MI (US); Thomas Heitzmann, Troy, MI (US)

(73) Assignee: Valeo Schalter und Sensoren GmbH (DE)

( * ) Notice: Subject to any disclaimer, the term of this patent is extended or adjusted under 35 U.S.C. 154(b) by 0 days.

(21) Appl. No.: 18/773,986

(22) Filed: Jul. 16, 2024

(65) Prior Publication Data

US 2026/0021805 A1      Jan. 22, 2026

(51) Int. Cl.
| | |
|---|---|
| B60W 30/09 | (2012.01) |
| B60W 10/18 | (2012.01) |
| B60W 50/00 | (2006.01) |
| B60W 50/16 | (2020.01) |

(52) U.S. Cl.
CPC ............ B60W 30/09 (2013.01); B60W 10/18 (2013.01); B60W 50/0097 (2013.01); B60W 50/16 (2013.01); *B60W 2300/36* (2013.01); *B60W 2420/40* (2013.01); *B60W 2554/802* (2020.02); *B60W 2754/30* (2020.02)

(58) Field of Classification Search
CPC .. B60W 30/09; B60W 10/18; B60W 50/0097; B60W 50/16; B60W 2300/36; B60W 2420/40; B60W 2554/802; B60W 2754/30
See application file for complete search history.

(56) References Cited

U.S. PATENT DOCUMENTS

| | | | | |
|---|---|---|---|---|
| 8,473,144 B1 * | 6/2013 | Dolgov | .................. | G08G 1/167 |
| | | | | 701/28 |
| 2009/0157286 A1 * | 6/2009 | Saito | ..................... | B60W 30/12 |
| | | | | 701/300 |
| 2016/0306357 A1 * | 10/2016 | Wieskamp | ............ | B60W 30/12 |
| 2017/0169710 A1 * | 6/2017 | Beaurepaire | ........... | G08G 1/163 |
| 2017/0341647 A1 * | 11/2017 | Rajvanshi | ............. | B60W 30/08 |
| 2018/0057003 A1 * | 3/2018 | Hyun | ................ | B60W 60/0016 |
| 2018/0061253 A1 * | 3/2018 | Hyun | .................... | B60W 30/12 |
| 2020/0031349 A1 * | 1/2020 | Jia | ..................... | B60W 50/0098 |

(Continued)

FOREIGN PATENT DOCUMENTS

| | | | | | |
|---|---|---|---|---|---|
| CN | 117168452 A | * | 12/2023 | ............. | G06V 20/56 |
| DE | 102012005245 A1 | * | 9/2012 | ...... | B60W 30/18163 |

(Continued)

OTHER PUBLICATIONS

International Search Report and Written Opinion for PCT/EP2025/ 070346, Mail date of Oct. 13, 2025, All together 12 Pages.

*Primary Examiner* — Babar Sarwar
(74) *Attorney, Agent, or Firm* — Dickinson Wright PLLC

(57) ABSTRACT

Systems and methods for enhancing safety during motorcycle lane-splitting or lane filtering by using a camera to capture images of adjacent vehicles and a processor to analyze these images to predict vehicle trajectories. The systems and methods disclosed predict future vehicle trajectories, calculates potential distances, and issues a warning if the anticipated separation between vehicles falls below a predefined safety threshold, thereby signaling unsafe conditions for lane splitting.

20 Claims, 5 Drawing Sheets

500

(56)     References Cited

U.S. PATENT DOCUMENTS

| | | | | |
|---|---|---|---|---|
| 2020/0139960 A1* | 5/2020 | Newman | | G05D 1/617 |
| 2020/0384994 A1* | 12/2020 | Pfau | | B60W 30/14 |
| 2021/0245740 A1* | 8/2021 | George | | B60W 30/18163 |
| 2022/0383421 A1* | 12/2022 | Grivel | | B60W 40/09 |
| 2022/0402491 A1* | 12/2022 | Jaekel | | B60W 30/09 |
| 2023/0123611 A1* | 4/2023 | Foster | | G01S 17/931 |
| | | | | 701/24 |
| 2023/0286498 A1 | 9/2023 | Oguri et al. | | |
| 2023/0311875 A1* | 10/2023 | Nishiguchi | | B60W 30/18163 |
| | | | | 701/25 |
| 2023/0339494 A1 | 10/2023 | Hack et al. | | |
| 2023/0373476 A1* | 11/2023 | Ho | | B60W 50/14 |
| 2024/0010218 A1* | 1/2024 | Rosman | | B25J 11/008 |
| 2024/0123987 A1* | 4/2024 | Wang | | B60W 50/0097 |
| 2024/0336265 A1* | 10/2024 | Yokokawa | | B60W 30/143 |

FOREIGN PATENT DOCUMENTS

| | | | | | |
|---|---|---|---|---|---|
| EP | 3098799 | A1 * | 11/2016 | | B60W 50/14 |
| EP | 4063216 | A1 * | 9/2022 | | G08G 1/22 |
| EP | 4082859 | A1 | 11/2022 | | |
| EP | 4378780 | A1 * | 6/2024 | | B60W 30/09 |
| JP | 2023175515 | A | 12/2023 | | |
| WO | WO-2018074288 | A1 * | 4/2018 | | G06V 20/58 |

* cited by examiner

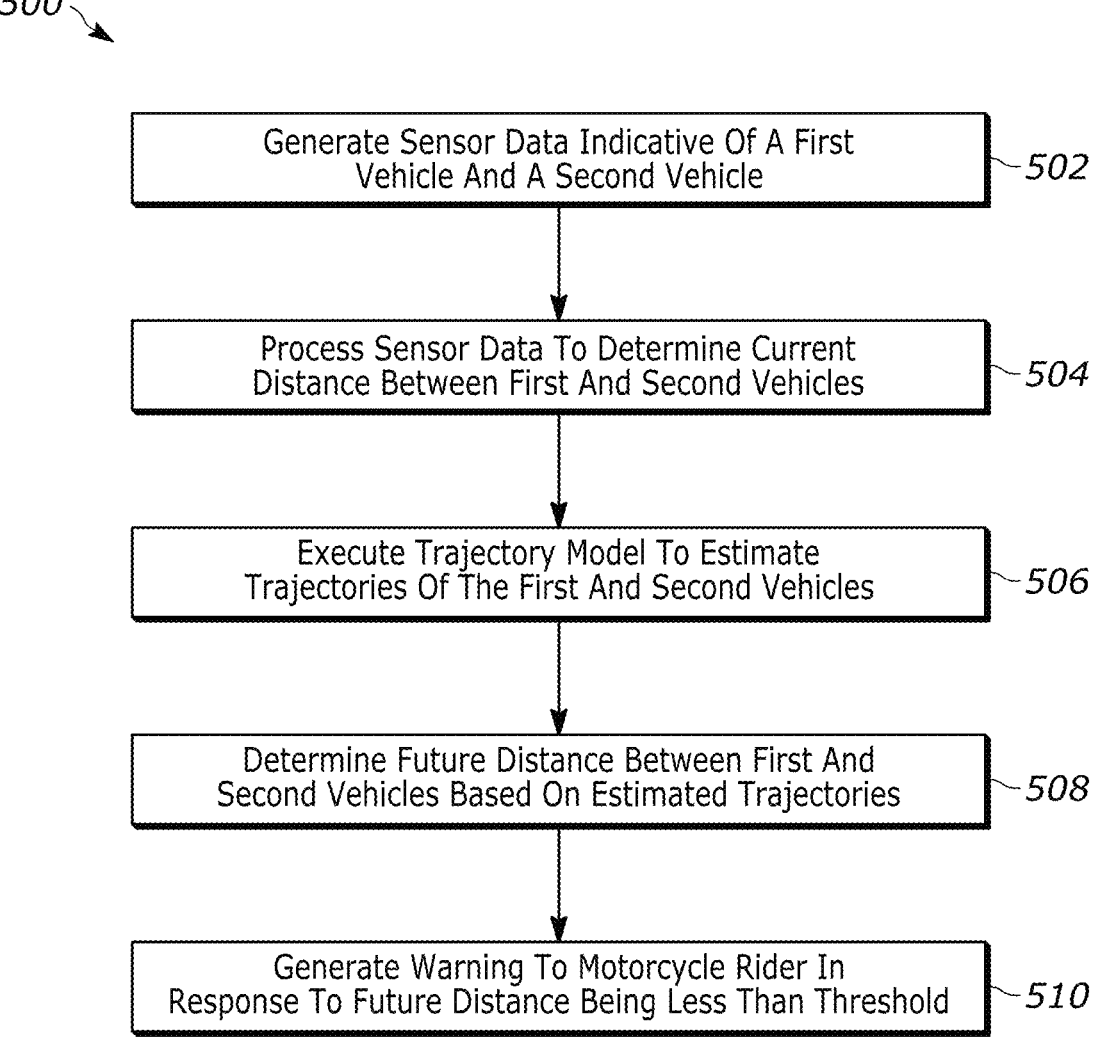

500

Generate Sensor Data Indicative Of A First
Vehicle And A Second Vehicle          502

Process Sensor Data To Determine Current
Distance Between First And Second Vehicles          504

Execute Trajectory Model To Estimate
Trajectories Of The First And Second Vehicles          506

Determine Future Distance Between First And
Second Vehicles Based On Estimated Trajectories          508

Generate Warning To Motorcycle Rider In
Response To Future Distance Being Less Than Threshold          510

FIG. 5

METHODS AND SYSTEMS FOR ASSISTING DRIVER DURING LANE SPLITTING

TECHNICAL FIELD

The present disclosure relates to methods and systems for assisting a driver of a two-wheeled vehicle (e.g., motorcycle) during a lane splitting maneuver.

BACKGROUND

The practice of lane splitting, wherein a motorcyclist or bicyclist navigates between lanes or cars in adjacent lanes, can be a perilous maneuver on roads. This practice is particularly prevalent in congested traffic situations, offering a way for the motorcyclist to bypass vehicular congestion. However, it introduces significant risks primarily due to the unpredictability of surrounding vehicle movements. Incidents often occur when these vehicles inadvertently close the gaps essential for safe lane splitting, posing a threat of collision. The severity of this issue is highlighted by the number of accidents involving motorcycles during lane splitting. These accidents typically stem from a motorcyclist being forced to execute abrupt maneuvers, such as excessive braking, to avoid a collision when drivers in adjacent lanes reduce the space required for safe passage.

SUMMARY

According to an embodiment, a collision avoidance system for mitigating or inhibiting collisions during a motorcycle lane-splitting or lane-filtering event is provided. The system includes a vehicle sensor mounted to a motorcycle and configured to capture sensor data indicative of (a) a first vehicle in a first lane ahead of the motorcycle, and (b) a second vehicle in a second lane ahead of the motorcycle. The system includes a processor coupled to the vehicle sensor and configured to process the sensor data. Memory has instructions that, when executed by the processor, cause the processor to: process the sensor data to determine a current distance between the first and second vehicles; execute a trajectory model to estimate a trajectory of the first vehicle and a trajectory of the second vehicle; determine a future distance between the first and second vehicles based on the estimated trajectory of the first vehicle and the estimated trajectory of the second vehicle; and generate a warning to a rider of the motorcycle in response to the determined future distance being less than a threshold distance, wherein the warning provides an indication that lane splitting or lane filtering is unsafe.

In another embodiment, method for enhancing safety during a motorcycle lane-splitting or lane-filtering event includes: capturing, via a vehicle sensor mounted to a motorcycle, sensor data indicative of a first vehicle located ahead of the motorcycle in a first lane and a second vehicle located ahead of the motorcycle in a second lane; processing, via a processor communicatively coupled to the vehicle sensor, the captured sensor data; determining, via the processor, a current distance between the first vehicle and the second vehicle based on the processed sensor data; executing, via the processor, a trajectory model to estimate a trajectory for the first vehicle and a trajectory for the second vehicle; calculating, via the processor, a future distance between the first and second vehicles based on the estimated trajectories of the first and second vehicles; and generating, via the processor, a warning to a rider of the motorcycle in response to the calculated future distance being less than a threshold distance, wherein the warning provides an indication that lane splitting or lane filtering is unsafe.

In another embodiment, a non-transitory computer-readable medium has instructions stored thereon. The instructions, when executed by a processor in a motorcycle, cause the processor to: receive sensor data from a vehicle sensor mounted to a motorcycle, the sensor data indicative of a first vehicle ahead of the motorcycle in a first lane and a second vehicle ahead of the motorcycle in a second lane; process the received sensor data to determine a current distance between the first vehicle and the second vehicle; execute a trajectory model to estimate a future trajectory for the first vehicle based on the received sensor data and a future trajectory for the second vehicle based on the received sensor data; calculate a future distance between the first and second vehicles based on the estimated future trajectory of the first vehicle and the estimated future trajectory of the second vehicle; and generate a warning to be provided to a rider of the motorcycle in response to the calculated future distance being less than a threshold distance, wherein the warning indicates that conditions for lane splitting or lane filtering are unsafe.

BRIEF DESCRIPTION OF THE DRAWINGS

FIG. 5 is a flowchart of a method, according to an embodiment.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In the context of the discussed embodiments, the term "two-wheeled vehicles" includes not only motorcycles but also encompasses a variety of other vehicles such as bicycles, scooters, mopeds, and electric bikes. This broader categorization expands the applicability of the discussed collision avoidance system to various forms of transportation that utilize two wheels for mobility. Each of these vehicle types may similarly benefit from the enhanced safety measures provided by the system during maneuvers akin to lane splitting, especially in dense traffic situations or in environments where multiple vehicular paths converge.

Furthermore, the term "lane splitting" can refer to a motorcycle maneuvering between two other vehicles (cars, trucks, SUVs, motorcycles, vans, etc.) traveling in the same direction as the motorcycle. Lane splitting typically involves a motorcyclist riding between lanes of slow-moving or stopped traffic on a roadway, typically in situations where cars are congested or traffic is moving slowly. In contrast, "lane filtering" can refer to a motorcyclist moving between adjacent lanes of traffic that is stopped at an intersection or traffic light. It should be understood that the embodiments of the inventions disclosed herein can apply to both lane splitting and land filtering alike, unless otherwise indicated.

Figure 1:
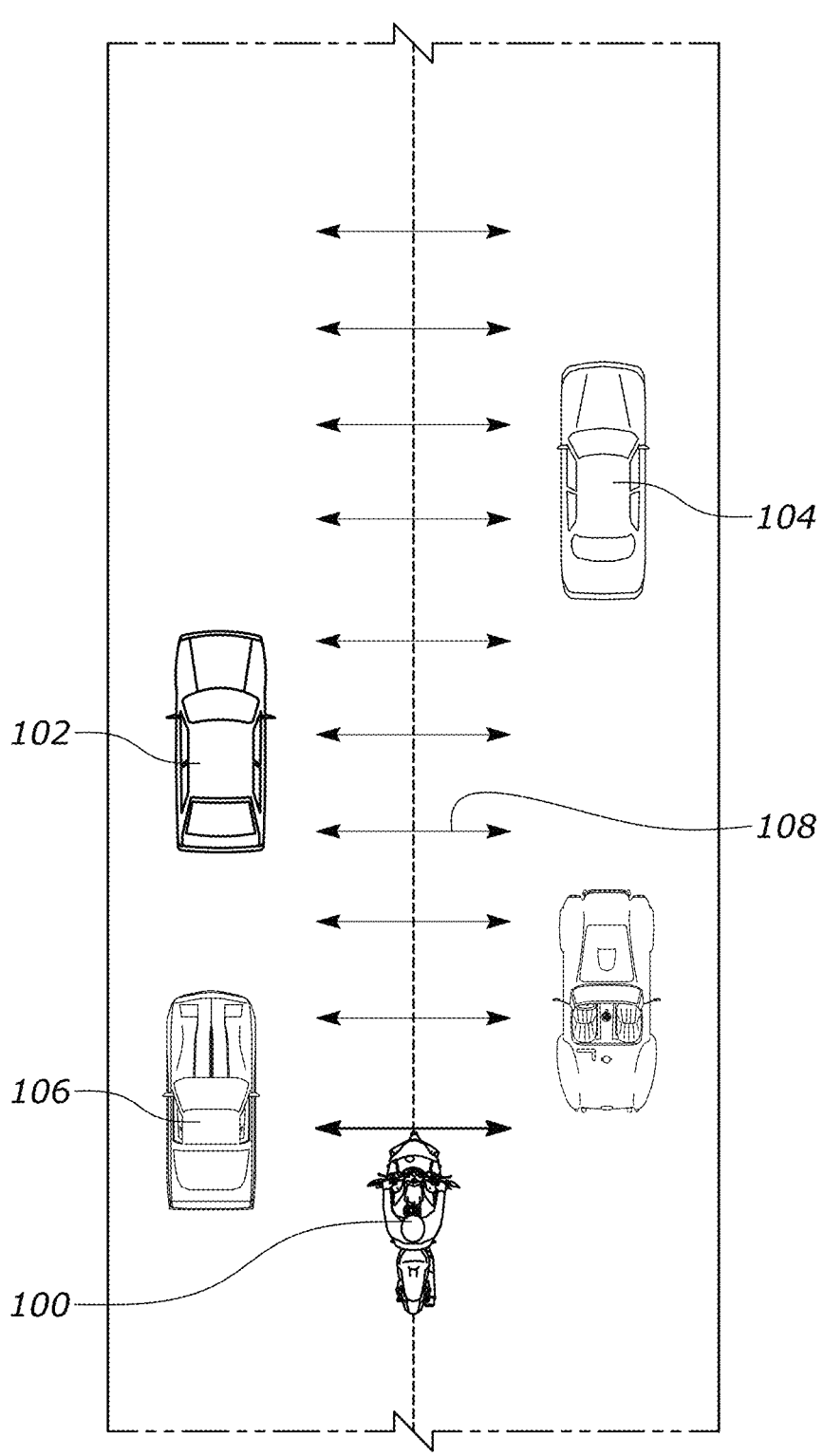
FIG. 1 shows a top view schematic of a roadway scene depicting a motorcycle and multiple vehicles positioned in adjacent lanes, illustrating the operational context of a collision avoidance system during motorcycle lane-splitting, according to an embodiment.

FIG. 1 shows a top view perspective of a traffic scenario including multiple vehicles on a road. Specifically, a motorcycle 100 is illustrated as being positioned behind the first vehicle 102, second vehicle 104, and third vehicle 106, proceeding in a configuration that is representative of a lane-splitting situation. (Of course, while a motorcycle 100 is depicted, the inventions described herein can apply to other two-wheeled vehicles or other vehicles that perform a lane-splitting maneuver.) The distance between vehicles, denoted by the dashed lines 108, is evident between first vehicle 102 and second vehicle 104, highlighting a critical spatial parameter relevant to the described system's function.

In the scenario depicted, first vehicle 102 and second vehicle 104 are illustrated as being in adjacent lanes, with the motorcycle 100 aiming to navigate between them in a lane splitting maneuver. This demonstrates the operational context of the collision avoidance system disclosed herein, which evaluates the feasibility and safety of the motorcycle 100 proceeding with the lane-splitting maneuver based on calculated trajectories and current distances between these vehicles.

The methods and systems disclosed herein are designed to enhance motorcycle rider safety during lane-splitting by actively monitoring and predicting the positions of nearby vehicles and their trajectories. By analyzing this configuration, one can appreciate how the camera and processor system uses the observed positions of first vehicle 102 and second vehicle 104 to assess and respond to dynamically changing road conditions, which could potentially impact the safety of lane-splitting maneuvers performed by motorcycle 100.

Figure 2:
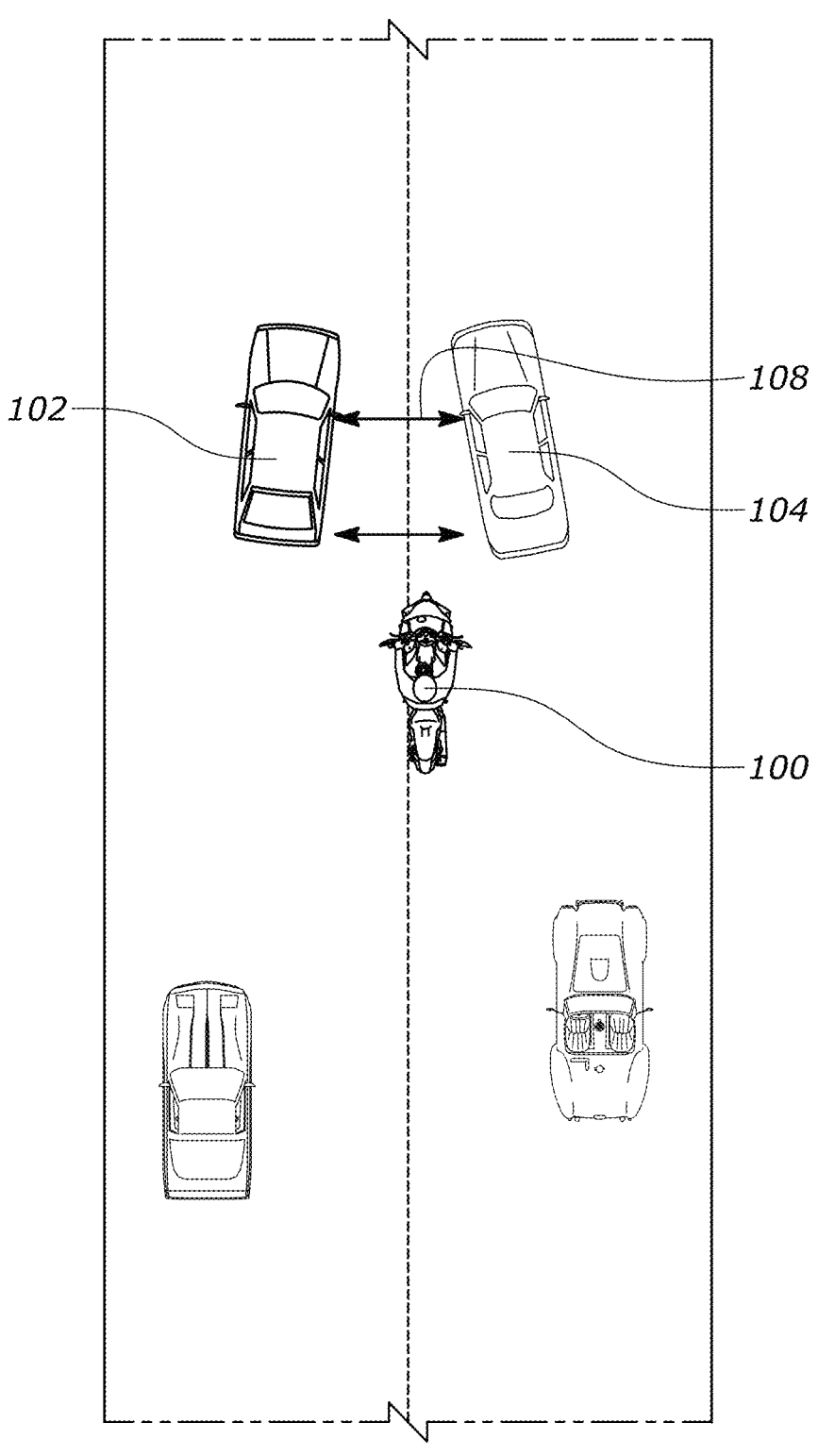
FIG. 2 is a similar view with the distance between two vehicles on the road shrinking, thereby leading to a potentially unsafe lane-splitting maneuver.

FIG. 2 illustrates a continuation of the roadway scenario from FIG. 1 where conditions have changed, posing increased risk for motorcycle 100 engaged in a lance-splitting maneuver. In this depiction, the trajectory of first vehicle 102 and second vehicle 104 is shown converging towards each other, reducing the previously available space between them. In other words, the dashed lines 108 from FIG. 1 have decreased in size between the first and second vehicles 102, 104. The updated positions of first vehicle 102 and second vehicle 104 show them closer than in the prior scenario, highlighting a dynamic and potentially hazardous traffic situation.

The motorcycle 100, following behind these vehicles 102, 104, faces a decreased gap due to the diminishing distance between the two vehicles. This scenario visually supports the functionality of the discussed collision avoidance system, where such a decrease in space necessitates timely predictive calculations and alerts. In this visual representation, as will be described, a visual or audible alert could be activated on the motorcycle's display system, warning the rider that the reduced distance between vehicles no longer supports safe lane splitting.

Additionally, this figure emphasizes the role of the trajectory model executed by the system's processor, as discussed in the provided claims, demonstrating how real-time data processing can predict critical changes in traffic layout that affect the rider's decision-making process. Through this illustration, the practical impact of implementing the described collision avoidance system focuses on enhancing rider safety by managing and adapting to rapid changes in road conditions.

Figure 3:
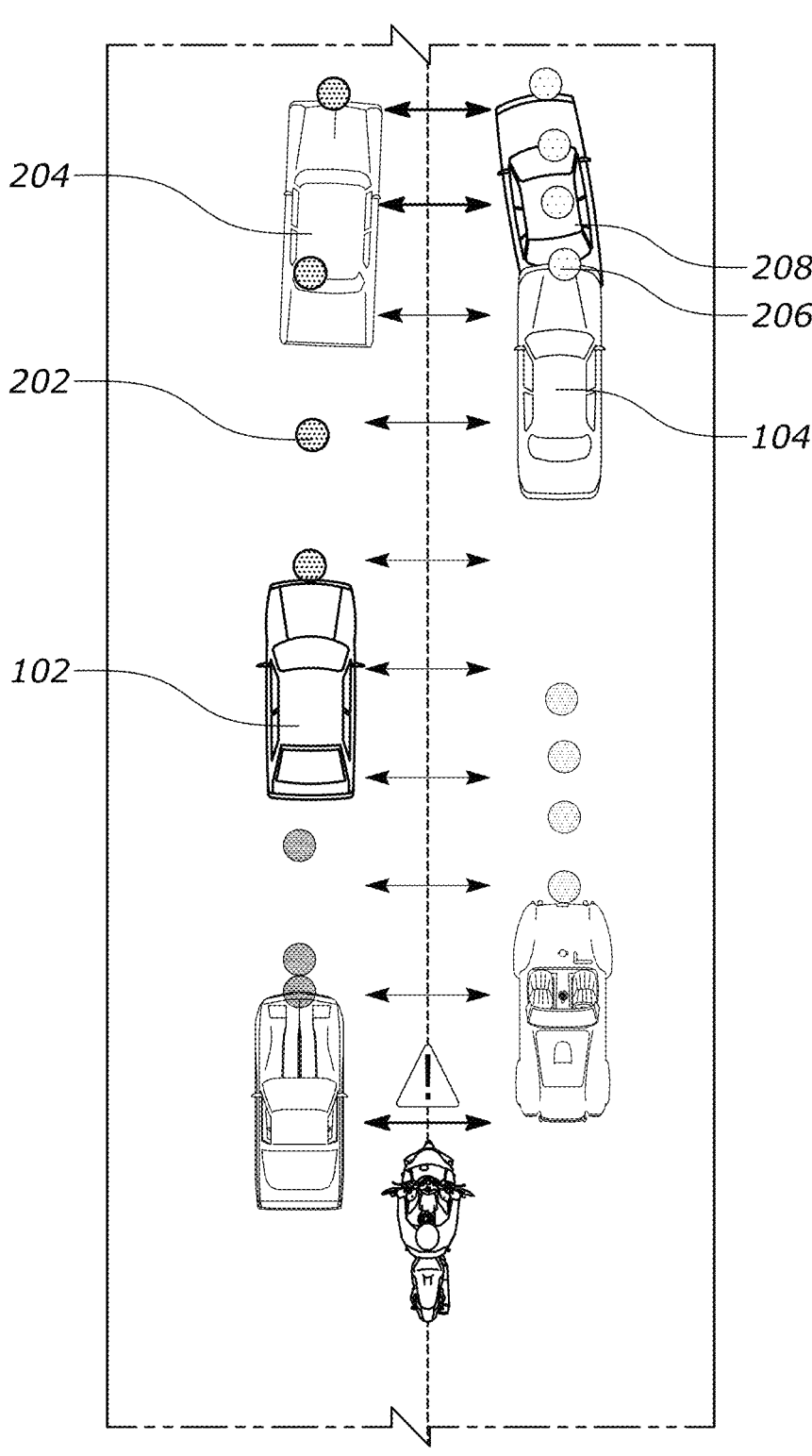
FIG. 3 illustrates a top view schematic of the operational environment of a collision avoidance system for motorcycles, depicting a motorcycle and multiple vehicles in two lanes with respective estimated trajectories and future positions, according to an embodiment.

FIG. 3 presents an expanded view of the dynamic interplay between vehicle movements and predictive system analysis in an ongoing lane-splitting situation on a roadway, according to an embodiment. This figure visually emphasizes the effectiveness of the trajectory prediction capabilities of the collision avoidance system disclosed herein.

In this graphic, the motorcycle 100 is once again depicted conducting a lane splitting maneuver between first vehicle 102 and second vehicle 104, both situated in adjacent lanes. The collision avoidance system disclosed herein is configured to determine a trajectory of the first and second vehicles 102, 104. The trajectory paths (202 associated with the first vehicle 102, and 206 associated with the second vehicle 104) of these vehicles are illustrated with dotted lines that project forward from their current positions. These projected paths are indicative of the vehicles' predicted future locations, calculated by the system's processor. In embodiments, a trajectory model is executed by the processor to determine the future trajectories of the first and second vehicles 102, 104.

The dotted lines or points 202, 206 on each vehicle's trajectory represents significant positions or locations at predetermined intervals along their predicted paths. These points aid in visualizing the positional changes over time, according to the trajectory models processed by the system. For example, the first vehicle 102 has a current position shown at 102, and a projected future position based on its trajectory shown at 204. Likewise, the second vehicle 104 has a current position shown at 104, and a projected future position based on its trajectory shown at 208. A future position of each vehicle can be located at or along the trajectory paths. Based on the convergence of these future positions (e.g., leading to a reduced distance between vehicles 102, 104), the system identifies a potential reduction in the safe distance required for motorcycle 100 to continue the lane-splitting maneuver safely.

In embodiments, the collision avoidance system generates a warning (e.g., visible, audible, haptic, etc.) for the rider, based upon the predicted closure of safe passing space between the vehicles. This alert is driven by the system's evaluation that the anticipated future distance between first vehicle 102 and second vehicle 104 falls below a predefined distance threshold indicative of the lane-splitting maneuver leading to unsafe conditions. The predefined safety threshold can be established based on various parameters including but not limited to the speed of motorcycle 100, the speed of first vehicle 102, the speed of second vehicle 104, and the current distance between first vehicle 102 and second vehicle 104, the distance between the projected paths of the first vehicle 102 and the second vehicle 104, and other factors. Additionally, environmental conditions such as road wetness, visibility, and traffic density may also be factored into the calculation of this threshold by the system. The alert mechanism is configured to produce visual indications which may comprise varying colors, symbols, or flashing signals on the display system of motorcycle 100, thereby providing the rider with clear and immediate feedback regarding the proximity risks.

Types of warnings that can be provided to the rider in response to the predicted unsafe lane-splitting conditions may include visible warnings, audible warnings, and haptic warnings. Visible warnings may encompass the display of symbols, text, or graphical representations on a dashboard or helmet-mounted display, which indicate the immediacy of the danger. These visual alerts may vary in color, such as switching from green to red, and might include flashing lights to draw the rider's attention effectively. Audible warnings could include different tones, beeps, or verbal messages through the motorcycle's sound system or through a Bluetooth-enabled helmet, advising the rider to adjust their maneuver. Haptic warnings include vibrations which could be transmitted through the seat or handlebars of the motorcycle, offering tactile feedback to the rider that a potentially hazardous situation is developing. Each type of warning is configured to ensure that the rider receives a timely and understandable alert to encourage immediate corrective action, thereby enhancing the rider's safety during lane splitting.

In an embodiment, the collision avoidance system can be configured to prioritize the type of warning based on the urgency and nature of the detected unsafe condition. For instance, under conditions determined to be less severe based on the distance and relative speed between the motorcycle and nearby vehicles, the system might initially activate a visible warning only. Conversely, under conditions determined to be more severe based on a shorter distance and/or higher relative speeds between the motorcycle and the first and second vehicles, the system could trigger simultaneous visible, audible, and haptic warnings. This tiered approach allows the rider to receive appropriate cues based on the immediacy and severity of the situation.

In yet another embodiment, the system may further include customization options for the type of warnings provided. For example, the rider may select, through a user interface, the preferred primary method of warning—visual, auditory, or tactile—or any combination thereof depending on personal sensitivity or situational requirements. The user interface might allow for adjustments to the intensity, color, and pattern of the visual alerts, the volume and type of the audible alerts, and the strength and pattern of the haptic feedback.

In a further embodiment, the alert system may integrate environmental data to modify the warning signals issued to the rider. For instance, under conditions of poor visibility, such as fog or heavy rain, the system may automatically increase the intensity or frequency of visual and audible warnings to compensate for reduced rider visibility and auditory perception. This adaptive response ensures that the rider remains adequately informed of potential hazards regardless of external environmental conditions.

As will be further described below, in certain embodiments, the collision avoidance system may incorporate various sensor technologies to enhance the detection and projection of distances between vehicles, thereby improving the safety evaluations for motorcycle lane-splitting maneuvers. These sensor technologies could include, but are not limited to, LIDAR (Light Detection and Ranging), RADAR (Radio Detection and Ranging), ultrasonic sensors, and advanced optical cameras. Collectively, these sensors may be referred to as vehicle sensors or collision-avoidance sensors. LIDAR sensors, for example, can be utilized to provide precise distance measurements between objects by emitting laser beams and measuring the time it takes for the reflected beams to return. This technology is beneficial for accurately determining the space between the first vehicle 102 and the second vehicle 104 in real-time, allowing for prompt and reliable trajectory estimations under varying traffic conditions. RADAR sensors are suitable for detecting the positions and speeds of vehicles even in adverse weather conditions, such as rain or fog, which might impair optical sensors. This capability ensures that the system remains functional and provides consistent performance, thereby aiding in the safety of the motorcycle rider during lane-splitting. Ultrasonic sensors, typically used for shorter distance measurements, can assist in detecting close-proximity objects around the motorcycle. This can be particularly useful in dense traffic situations where the motorcycle is navigating through tight spaces, ensuring that the minimum safe distance needed for lane splitting is maintained. Optical cameras, equipped with image processing capabilities, can capture and process high-resolution images of the road environment. The processor can analyze these images using machine learning algorithms to detect edge boundaries, lane markings, and vehicle orientations. This information contributes to determining spatial relationships between vehicles and predicting potential movements that might impact the motorcycle's path. In any of these embodiments, these vehicle sensors can be configured to detect objects in the environment surrounding the motorcycle.

Figure 4:
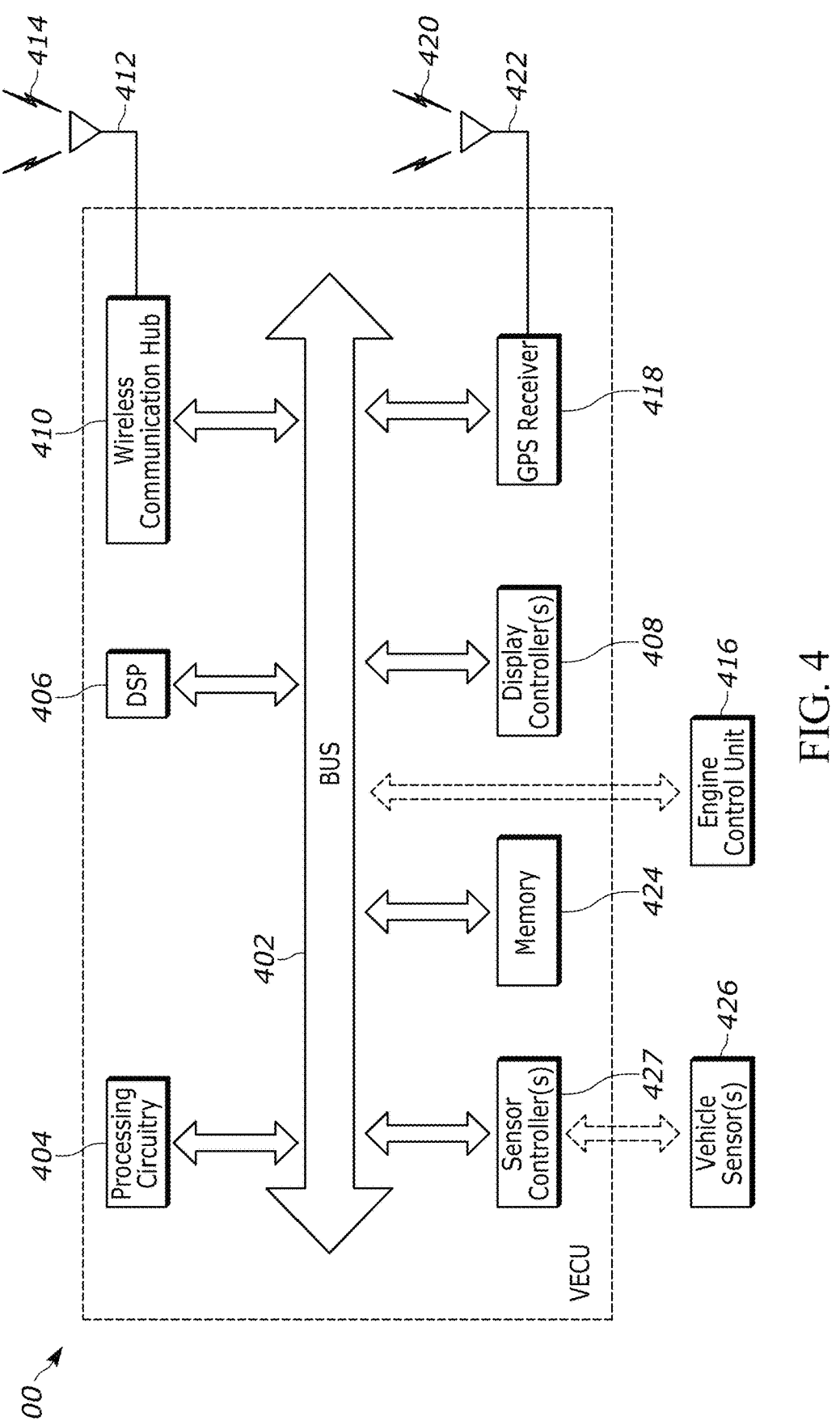
FIG. 4 is a block diagram of a vehicle electronics control system, according to an exemplary embodiment of the present disclosure.

FIG. 4 is a block diagram of internal components of an exemplary embodiment of the collision avoidance system disclosed herein. The collision avoidance system is also referred more generally as computing system 400. The computing system 400 may include or be used to implement the computing systems and control functions described above, such as determining the trajectory of vehicles on the road, and warning the driver of the motorcycle if the lane-splitting maneuver is not safe. In this embodiment, the computing system 400 may be embodied at least in part in a vehicle electronics control unit (VECU) onboard the motorcycle. However, it should be noted that FIG. 4 is meant only to provide a generalized illustration of various components, any or all of which may be utilized as appropriate. It can be noted that, in some instances, components illustrated by FIG. 4 can be localized to a single physical device and/or distributed among various networked devices, which may be disposed at different physical locations.

The computing system 400 has hardware elements that can be electrically coupled via a BUS 402. The hardware elements may include processing circuitry 404 which can include, without limitation, one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform the operations disclosed herein, including, among others, image processing, data processing, and implementation of the machine learning models (e.g., trajectory models) described above. Some embodiments may have a separate DSP 406, depending on desired functionality. The computing system 400 can also include one or more display controllers 408, which can control the vehicle's display devices that provide visual warnings to the driver, such as a dash screen. In other embodiments the display controller 408 or other similar controllers can be configured to operate the other systems of the collision avoidance systems to provide the appropriate warning to the driver; for example, this can include a haptic controller for providing haptic controls to the motorcycle's seat or handlebars, a sound controller for emitting sound via speakers to warn the driver, and the like.

The processing circuitry 404 can be configured to execute the trajectory model disclosed herein. In embodiments, the trajectory model predicts or determines the path of an object (e.g., other vehicles on the road) based on sensor data indicating initial position, velocity, and environmental factors, as well as historical trajectory data derived by the trajectory model. This trajectory model can utilize various machine learning algorithms including, but not limited to, neural networks, decision trees, or support vector machines. A neural network model, such as a convolutional neural network (CNN) or a recurrent neural network (RNN), may be used due to their capabilities in handling sequential data and their effectiveness in pattern recognition tasks. For example, a CNN may be employed in this model to effectively process spatial relationships within the data. The CNN architecture can include multiple layers that include convolutional layers, pooling layers, and fully connected layers. Each convolutional layer can apply various filters to its input to create feature maps that identify spatial hierarchies in the data. These feature maps are processed through subsequent layers to distill and enhance the essential features necessary for understanding complex patterns such as those found in trajectory data. In other embodiments, a deep learning model may be utilized. In addition, map-aware or interactions-aware predictors can be implemented as well.

On the other hand, a RNN may be used to handle the sequential nature of trajectory data, in embodiments. RNNs are particularly well-suited for modeling temporal dynamics due to their ability to maintain internal states, or memories, which allow them to process variable-length sequences of input data. An RNN in this model would process each point in the trajectory sequentially, retaining information from previous points to better predict future locations. This is achieved through the use of loops within the network architecture that pass information from one step of the sequence to the next, thereby enabling the network to develop an understanding of time-dependent patterns.

Both the CNN and RNN network architectures may be integrated into a single trajectory model to leverage the spatial processing capabilities of CNNs and the temporal processing capabilities of RNNs. This integration allows the model to effectively analyze the interactions of the input variables over time, enhancing the accuracy and reliability of trajectory predictions. Layers of processing units within these networks further facilitate the analysis by adjusting the weights and biases based on the input data, refining the model's output through multiple iterations of training. These are merely examples of the neural networks that can be utilized as part of the trajectory model.

The computing system 400 may also include a wireless communication hub 410, or connectivity hub, which can include a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 410 can permit data to be exchanged with a communication network, wireless access points, other computing systems, etc. The communication can be carried out via one or more wireless communication antenna 412 that send and/or receive wireless signals 414. This wireless communication can enable connection to nearby vehicles that have also detected a distance between the first and second vehicles. For example, if another vehicle on the roadway has executed a trajectory model and determined that the first vehicle 102 and second vehicle 104 are closing the gap between each other, that information can be communicated to the computing system 400 of the motorcycle. Likewise, information detected or generated onboard the motorcycle can be shared via the communication network.

The computing system 400 can also include or be configured to communicate with an engine control unit 416, or other type of controller described herein. In the case of a vehicle that does not include an internal combustion engine, the engine control unit may instead be a battery control unit or electric drive control unit configured to command propulsion of the vehicle. In response to instructions received other processors in the computing system 400, the engine control unit 416 can be operated in order to control the movement of the vehicle to avoid collision. For example, the engine control unit 416 may be configured to brake the motorcycle in the event the trajectory model determines that the future distance between the first and second vehicles 102, 104 is below a predetermined threshold.

The computing system 400 also includes vehicle sensors 426 such as those described above with reference. These sensors can include, without limitation, one or more camera(s), radar(s), LiDAR(s), and ultrasonic sensor(s), and the like. These sensors can be controlled via associated sensor controller(s) 427. The data generated by these vehicle sensors 426 can be executed by the processor(s) disclosed herein to drive operation of the trajectory model or other models disclosed herein, such that those models can predict future locations of other vehicles on the road.

The computing system 400 may also include a GPS receiver 418 capable of receiving signals 420 from one or more GPS satellites using a GPS antenna 422. The GPS receiver 418 can extract a position of the device, using conventional techniques, from satellites of an GPS system, such as a global navigation satellite system (GNSS) (e.g., Global Positioning System (GPS)), Galileo, GLONASS, Compass, Galileo, Beidou and/or other regional systems and/or the like.

The computing system 400 can also include or be in communication with a memory 424. The memory 424 can include, without limitation, local and/or network accessible storage, a disk drive, a drive array, an optical storage device, a solid-state storage device, such as a RAM which can be programmable, flash-updateable and/or the like. Such storage devices may be configured to implement any appropriate data stores, including without limitation, various file systems, database structures, and/or the like. The memory 424 can also include software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer. In embodiments, the memory 424 contains instructions that, when executed by one or more processors disclosed herein, cause the one or more processors to execute the trajectory models described herein, and provide appropriate warnings to the motorcycle driver based upon the trajectory models indicating the lane splitting maneuver is unsafe.

In embodiments, the computing system 400 can also be configured to determine the presence and location of lane lines on the roadway. For example, the vehicle sensors 426 can collect data reflective of their surroundings, and through processing this data, the system identifies the boundaries and markings that delineate the lanes. By analyzing the positional data of these lane markings, the system can accurately ascertain where the motorcycle will travel during the lane-splitting maneuver. This information can then be used to adjust the motorcycle's trajectory, ensuring it remains within the designated lane-splitting area, thereby enhancing the safety and efficiency of the maneuver. This information can also be used to determine which vehicles ahead of the motorcycle should be focused on for determining their future trajectories, locations, and distances therebetween.

As can be appreciated by those skilled in the art, several embodiments can incorporate the teachings provided herein. For example, in one an embodiment, a collision avoidance system for motorcycles is configured to evaluate and predict vehicle trajectories during a lane-splitting event to enhance rider safety. The system comprises various components detailed in FIG. 3 and FIG. 4, which interact to monitor, analyze, and provide timely alerts to the motorcycle rider. The system includes a camera (or other vehicle sensor) mounted on a motorcycle, capturing real-time images of the traffic scenario, particularly focusing on a first vehicle and a second vehicle traveling ahead in adjacent lanes. The captured images are communicated to a processor that is part of a computing system, which may be integrated into the motorcycle's vehicle electronics control unit (VECU) as shown in FIG. 4. The processor, equipped with memory containing executable instructions, processes these images to determine the current distance between the first and second vehicles. Utilizing a trajectory model, the processor estimates future trajectories or locations for these vehicles based on their current positions, movements, and potential changes in speed or direction. As illustrated in FIG. 3, the system calculates future positions of the first and second vehicles, depicted as dotted lines projecting forward from their respective current locations. These projections allow the system to predict where these vehicles will be at subsequent time intervals, thus aiding in anticipating changes in the gap available for the motorcycle to safely perform the lane-splitting maneuver. Should the predicted future distance between the first and second vehicles fall below a certain threshold, indicative of an impending closure of the safe lane-splitting gap, the system generates a warning. This warning is conveyed to the rider through various modalities as set forth in the system's configuration. These alerts could be visual, audible, or haptic, as per the rider's settings or the severity of the traffic situation, emphasizing the immediacy of the potential hazard.

Along these lines, FIG. 5 illustrates a method 500 for executing a collision avoidance system during a motorcycle lane-splitting event, according to one embodiment. The depicted flowchart illustrates a sequence of operations designed to functionally execute within the framework of the described collision avoidance system. These operations are executed by a processor communicatively coupled to one or more vehicle sensors mounted on the motorcycle, as explained above.

The first operation 502 involves generating sensor data indicative of a first vehicle and a second vehicle ahead of the motorcycle. This data is essential for capturing the real-time positional context of these vehicles relative to the motorcycle. The data can be generated from a camera, lidar, radar, or other types of vehicles sensors explained above. In operation 504, the system processes this sensor data to determine the current distance between the first and second vehicles. This step serves as a baseline measurement from which safety determinations can be made.

After processing the current distances, operation 506 executes the trajectory model disclosed herein to estimate the future movement paths or trajectories of the first and second vehicles. Insight into these dynamics allows the system to predict positional changes over time. The trajectories of the first and second vehicles can include future location points of the vehicles, as illustrated in FIG. 3 above. Following this, operation 508 involves determining a future distance between the first and second vehicles based on the estimated trajectories. This step assesses whether the gap between vehicles will increase, decrease, or remain stable, which impacts subsequent safety actions.

Finally, operation 510 generates a warning to the motorcycle rider in response if the future distance between the vehicles is identified to be less than a predefined threshold distance. This warning alerts the rider to potential unsafe conditions for lane-splitting, thereby enhancing rider safety by suggesting precautionary measures such as deceleration or readiness to engage the brakes. The predefined threshold is configurable and can be adapted based on real-time data received via the system's sensors or by manual settings input by the rider or system administrator, allowing adjustments to be made according to specific scenarios or rider preferences. The threshold serves to activate the warning system when the anticipated future distance between the vehicles (calculated by the trajectory model mentioned) is predicted to fall below this set value, indicating an increased risk of accident during the lance-splitting maneuver.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A collision avoidance system for mitigating or inhibiting collisions during a motorcycle lane-splitting or lane-filtering event, the collision avoidance system comprising:

a vehicle sensor mounted to a motorcycle and configured to capture sensor data indicative of (a) a first vehicle in a first lane ahead of the motorcycle, and (b) a second vehicle in a second lane ahead of the motorcycle;

a processor communicatively coupled to the vehicle sensor and configured to process the sensor data; and memory having instructions that, when executed by the processor, cause the processor to:

process the sensor data to determine a current distance between the first and second vehicles;

execute a trajectory model to estimate a trajectory of the first vehicle and a trajectory of the second vehicle, wherein the estimated trajectories include predicted future locations of the first and second vehicles;

determine a future distance between the first and second vehicles based on the predicted future locations of the first vehicle and the estimated trajectory of the second vehicle, wherein the future distance is different than the current distance;

generate a warning to a rider of the motorcycle in response to the determined future distance being less than a threshold distance, wherein the warning provides an indication that lane splitting or lane filtering is unsafe, and braking the motorcycle in response to the determined future distance being less than a threshold distance.

2. The system of claim 1, wherein the vehicle sensor comprises one or more of the following: a camera, a LIDAR sensor, a RADAR sensor, an inertial measurement unit (IMU), and an ultrasonic sensor.

3. The system of claim 1, wherein the generated warning includes a visual warning displayed on a vehicle display.

4. The system of claim 1, wherein the generated warning includes a haptic warning provided through vibrations in a seat or handlebars of the motorcycle.

5. The system of claim 1, wherein the processor is further configured to adjust the threshold distance based on at least one of a speed of the motorcycle, a speed of the first vehicle, and a speed of the second vehicle.

6. The system of claim 1, wherein the trajectory model relies on or includes a convolutional neural network (CNN) or a recurrent neural network (RNN) to estimate the trajectory of the first vehicle and the trajectory of the second vehicle.

7. The system of claim 1, wherein the instructions, when executed by the processor, further cause the processor to:

issue commands to brake the motorcycle in response to the future distance being less than the threshold distance.

8. The system of claim 1, wherein the instructions, when executed by the processor, further cause the processor to:

process the sensor data to determine a presence and location of lane markings separating the first lane from the second lane.

9. The system of claim 8, wherein the instructions, when executed by the processor, further cause the processor to:

select the first and second vehicles out of a plurality of vehicles based on their locations relative to the lane markings.

10. A method for enhancing safety during a motorcycle lane-splitting or lane-filtering event, the method comprising:

capturing, via a vehicle sensor mounted to a motorcycle, sensor data indicative of a first vehicle located ahead of the motorcycle in a first lane and a second vehicle located ahead of the motorcycle in a second lane;

processing, via a processor communicatively coupled to the vehicle sensor, the captured sensor data;

determining, via the processor, a current distance between the first vehicle and the second vehicle based on the processed sensor data;

executing, via the processor, a trajectory model to estimate a trajectory for the first vehicle and a trajectory for the second vehicle, wherein the estimated trajectories include predicted future locations of the first and second vehicles;

calculating, via the processor, a future distance between the first and second vehicles based on the predicted future locations of the first and second vehicles, wherein the future distance is different than the current distance; and generating, via the processor, a warning to a rider of the motorcycle in response to the calculated future distance being less than a threshold distance, wherein the warning provides an indication that lane splitting or lane filtering is unsafe, and braking the motorcycle in response to the calculated future distance being less than a threshold distance.

11. The method of claim 10, further comprising displaying the warning on a display device mounted on the motorcycle.

12. The method of claim 10, wherein the warning is an audible warning emitted through a sound system of the motorcycle.

13. The method of claim 10, wherein the vehicle sensor is a camera, LIDAR sensor, or RADAR sensor configured to capture image data of the first vehicle and the second vehicle.

14. The method of claim 10, wherein the trajectory model relies on or includes a convolutional neural network (CNN) or a recurrent neural network (RNN) to estimate the trajectory of the first vehicle and the trajectory of the second vehicle.

15. The method of claim 10, further comprising adjusting the threshold distance based on at least one of road conditions, weather conditions, or a speed of the first vehicle.

16. A non-transitory computer-readable medium having stored thereon instructions that, when executed by a processor in a motorcycle, cause the processor to:

receive sensor data from a vehicle sensor mounted to a motorcycle, the sensor data indicative of a first vehicle ahead of the motorcycle in a first lane and a second vehicle ahead of the motorcycle in a second lane;

process the received sensor data to determine a current distance between the first vehicle and the second vehicle;

execute a trajectory model to estimate a future trajectory for the first vehicle based on the received sensor data and a future trajectory for the second vehicle based on the received sensor data, wherein the estimated trajectories include predicted future locations of the first and second vehicles;

calculate a future distance between the first and second vehicles based on the predicted future location of the first vehicle and the predicted future locations of the second vehicle; and generate a warning to be provided to a rider of the motorcycle in response to the calculated future distance being less than a threshold distance, wherein the warning indicates that conditions for lane splitting or lane filtering are unsafe, and braking the motorcycle in response to the calculated future distance being less than a threshold distance.

17. The non-transitory computer-readable medium of claim 16, wherein the trajectory model includes or relies upon a convolutional neural network (CNN) or a recurrent neural network (RNN).

18. The non-transitory computer-readable medium of claim 16, wherein the warning is communicated to the rider through an audible alert system integrated into the motorcycle.

19. The non-transitory computer-readable medium of claim 16, wherein the threshold distance is adjustable based on user input.

20. The non-transitory computer-readable medium of claim 16, wherein the future trajectory for the first vehicle and the future trajectory for the second vehicle is estimated based on historical trajectories of the first and second vehicles.

* * * * *